US009002787B2

(12) United States Patent
Ferrazzini et al.

(10) Patent No.: US 9,002,787 B2
(45) Date of Patent: Apr. 7, 2015

(54) METHOD AND APPARATUS FOR TRACKING DEVICE MANAGEMENT DATA CHANGES

(75) Inventors: Axel Ferrazzini, Toronto (CA); Nicholas P. Alfano, Stratford-Upon-Avon (GB); James Andrew Godfrey, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1391 days.

(21) Appl. No.: 12/363,177

(22) Filed: Jan. 30, 2009

(65) Prior Publication Data
US 2010/0198886 A1  Aug. 5, 2010

(51) Int. Cl.
*G06F 17/30* (2006.01)
*H04L 12/24* (2006.01)
*H04L 12/26* (2006.01)

(52) U.S. Cl.
CPC ............ *H04L 41/12* (2013.01); *H04L 41/0213* (2013.01); *H04L 41/0806* (2013.01); *H04L 41/082* (2013.01); *H04L 41/0863* (2013.01); *H04L 43/0817* (2013.01)

(58) Field of Classification Search
CPC ..... H04L 41/12; H04L 41/213; H04L 41/806; H04L 41/082; H04L 41/863; H04L 41/817
USPC .......................................................... 707/625
See application file for complete search history.

(56) References Cited

U.S. PATENT DOCUMENTS

| 2007/0156794 A1 | 7/2007 | Kisley et al. |
| 2007/0207800 A1 | 9/2007 | Daley et al. |
| 2007/0259633 A1 | 11/2007 | Rao |
| 2008/0114570 A1 | 5/2008 | Li et al. |
| 2008/0229142 A1 | 9/2008 | Anand et al. |
| 2008/0288630 A1 | 11/2008 | Merat et al. |
| 2009/0228509 A1* | 9/2009 | McCarthy et al. ............ 707/102 |
| 2009/0228606 A1* | 9/2009 | McCarthy et al. ............ 709/248 |
| 2010/0185679 A1 | 7/2010 | Ferrazzini et al. |

FOREIGN PATENT DOCUMENTS

| CN | 1866854 A | 11/2006 |
| CN | 1953394 A | 4/2007 |
| EP | 2006789 A2 | 12/2008 |
| JP | 2008305287 A | 12/2008 |
| KR | 100845000 B1 | 7/2008 |
| WO | 2007084958 A1 | 7/2007 |
| WO | 2007113836 A2 | 10/2007 |

(Continued)

OTHER PUBLICATIONS

European Search and Examination Report; EP Application No. 09152094.0; May 18, 2009; 5 pgs.

(Continued)

*Primary Examiner* — Jay Morrison
(74) *Attorney, Agent, or Firm* — Conley Rose, P.C.; J. Robert Brown, Jr.

(57) ABSTRACT

A method and apparatus for tracking device management data changes comprising storing information related to modification to device management data wherein the device management data is stored in an Open Mobile Alliance (OMA) compliant device management tree of Managed Objects (MO).

28 Claims, 3 Drawing Sheets

(56) References Cited

FOREIGN PATENT DOCUMENTS

| WO | 2008022195 A1 | 2/2008 |
|---|---|---|
| WO | 2008050042 A2 | 5/2008 |

OTHER PUBLICATIONS

Open Mobile Alliance; SyncML Device Management Tree and Description; Version 1.1.2; OMA-SyncML-DMTND-V1_1_2-20031202-A; Dec. 2, 2003; 44 pgs.
PCT International Search Report; PCT Application No. PCT/CA2010/000085; Mar. 11, 2010; 3 pgs.
PCT Written Opinion of the International Searching Authority; PCT Application No. PCT/CA2010/000085; Mar. 11, 2010; 6 pgs.
Open Mobile Alliance, Ltd., Device Management, Version 2.0, Oct. 6, 2008, 4 pages.
Open Mobile Alliance, Ltd., SyncML Device Management Protocol, Version 1.1.2, Dec. 12, 2003, 41 pages.
PCT International Preliminary Report on Patentability; Application No. PCT/CA2010/000085; May 18, 2011; 9 pages.
Oracle; Oracle Database Backup and Recovery Basics; 10g Release 2 (10.2); Nov. 2005; 220 pages.
European Examination Report; Application No. 09152094.0; May 4, 2012; 4 pages.
Chinese Office Action; Application No. 201080005988.0; Jul. 12, 2013; 15 pages.
Korean Office Action; Application No. 10-2011-7020079; Aug. 2, 2013; 9 pages.
European Extended Search Report; Application No. 13153816; Jun. 13, 2013; 5 pages.
European Examination Report; Application No. 09152094.0; Jan. 26, 2011; 4 pages.
PCT Written Opinion of the International Preliminary Examining Authority; Application No. PCT/CA2010/000085; Jan. 25, 2011; 6 pages.
European Examination Report; Application No. 09152094.0; Jan. 8, 2013; 4 pages.
Canadian Office Action; Application No. 2,751,149; Mar. 22, 2013; 2 pages.
Korean Office Action; Application No. 10-2011-7020079; Mar. 18, 2013; 11 pages.
Open Mobile Alliance; "OMA Device Management Tree and Description"; OMA-TS-DM_TND-V1_2-20060602-C; Candidate Version 1.2; Jun. 2, 2006; 48 pages.
European Examination Report; Application No. 13153816.7; May 6, 2014; 5 pages.
Japanese Office Action; Application No. 2011-546552; Mar. 25, 2013; 5 pages.
Japanese Office Action; Application No. 2011-546552; Oct. 9, 2012; 5 pages.

\* cited by examiner

METHOD AND APPARATUS FOR TRACKING DEVICE MANAGEMENT DATA CHANGES

BACKGROUND

As used herein, the terms "user equipment" and "UE" might in some cases refer to mobile devices such as mobile telephones, Smartphone, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a user equipment (UE) or a relay node to access other components in a telecommunications system.

The Open Mobile Alliance (OMA) Device Management (DM) specification supports extensions called Management Objects (MOs), which are logical collections of related pieces of data stored in a virtual DM tree. A UE that supports OMA DM typically has an embedded OMA DM client that acts as an intermediary between MOs and the applications, functions, agents, or other software or firmware components on the UE that might make use of the MOs to configure their services. An entity that interacts with the OMA DM client on the UE and an OMA DM server includes a Management Authority (MA) which may be a user, a network operator, a handset manufacturer, an enterprise administrator, an agent, or an application that may create, modify, or delete an MO, and may make requests to the UE.

Each MO on a UE typically contains data related to a specific application or capability of the UE. For example, an email MO might contain data associated with an email agent. If multiple email agents are installed on a UE, each might use a separate email MO, or they might all use the same email MO. All of the MOs and agents on a UE typically interact via a single DM client. The device management (DM) tree organizes the MOs in a logical hierarchical manner. Each of these MOs might include multiple nodes that include a single integer value, an indicator, a flag, a universal resource identifier (URI), or might include, for example, a picture and/or other information.

An MO registry is maintained as a repository for values used for MO descriptions. The labels used in the MO registry can refer to assignments of values to MOs defined by OMA work groups, assignments of values to MOs defined by external entities, and/or values that are used for testing or private use. A copy of the MO description can be linked to each registered MO.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
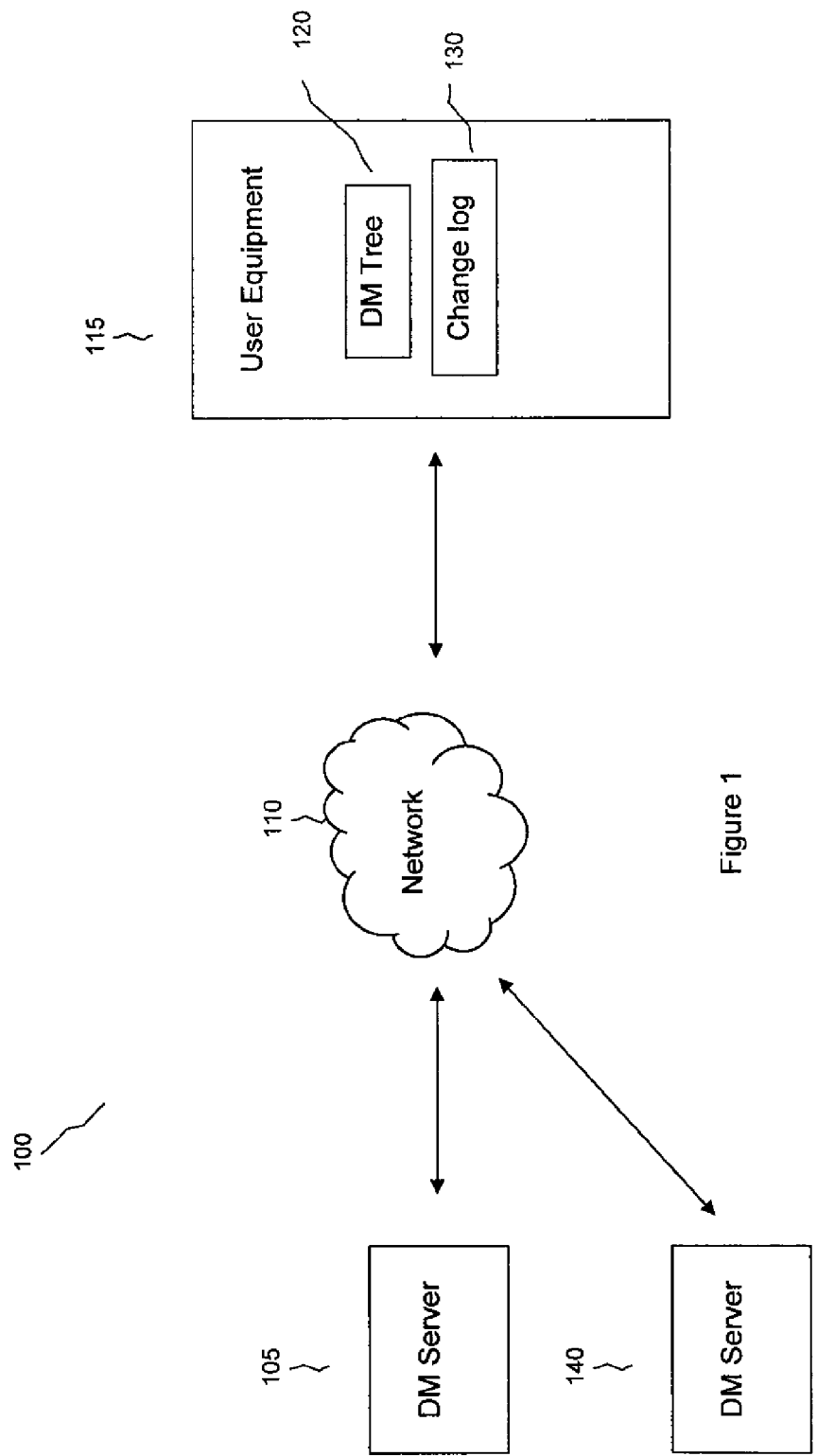
FIG. 1 is a diagram illustrating an example system suitable for implementing an embodiment of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Open Mobile Alliance (OMA) Device Management (DM) standard provides for a DM tree of Managed Objects (MO) to be stored on a user equipment (UE). The MOs may be used in a variety of ways to include provisioning, configuring, upgrading software and fault tracking on a UE. As used herein, the term provisioning may include enabling and disabling of features on the UE. As used herein, the term configuring may include modifying settings and parameters of the UE. As used herein, the term software upgrades may include installation of new software or bug fixes for pre-installed software to include application software and system software. As used herein, the term fault tracking may include reporting errors or status of the UE. The UE may use all or a subset of the MOs described herein.

The DM tree on the UE may be accessed and managed by a DM client on the UE. The DM client on the UE may interact with a network component configured as a DM server. The DM server may issue commands to the DM client on the UE which may in turn apply changes to the DM tree of MOs on the UE. Several DM servers may be issuing commands to the DM client on the UE to modify the same DM tree. For example, a first DM server may provide configuration information for email services and a second DM server may provide information on an internet service. Both the first and the second server may need to know the status of the current DM tree on the UE prior to making updates in order to prevent conflicts or the inefficiency of installing the same update twice.

Before a DM server acts on a DM tree on a UE, it may be necessary for the DM server to be synchronized with the current state of the DM tree on the UE. Currently the DM server issues a command to read the entire DM tree and return the state of all the MOs on a UE to facilitate synchronization of the UE status with the DM server status. Requiring the entire DM tree and all of the data in the MOs to be transmitted from the UE to the DM server is a resource intensive process. The present disclosure provides for recording changes to the DM tree in a separate data structure, such as a file or log. As used herein, the term change log may be used to refer to the data structure where the changes made to the DM tree on the UE are stored. A change log may include information such as: the MO that was changed; the new value of the MO; the date and time the change was made; the entity that requested the change; and any other useful information. The change log may be a file, database, spreadsheet, a table within a database or any other medium or arrangement for storing data.

The DM servers may maintain information about the DM tree that is stored on the UE. Whenever the DM server needs to perform an update to the MOs on the UE, the DM server may first request the change log from the UE. Additionally the DM server may routinely update the records stored on the DM server by requesting the change log from the UE on a periodic basis. After receiving the change log from the UE the DM server may then update the records stored on the DM server using the information provided by the change log from the UE. The changes to the DM tree and MOs may be referred to herein as "DM changes" or "DM deltas".

The change log may be used for restoring the DM tree to a UE that loses configuration settings. For example a UE may be dropped or damaged and lose the configuration settings stored in the DM tree. If the DM tree on the UE is lost, the UE may request the DM server to provide the most recent version of the DM tree stored on the DM server, to include the change log stored on the DM server. The UE may then use the DM tree and change log provided by the DM server to restore the DM tree on the UE.

The change logs may also be used to undo changes made to the DM tree on the UE. For example, a DM server may send a change to the DM tree on the UE that causes the UE to malfunction. The UE may then use the change log to sequentially undo changes made to the DM tree. The UE may continue to undo changes until the malfunction is corrected.

FIG. 1 is a diagram illustrating an example system 100 suitable for implementing one or more embodiments disclosed herein. The system 100 includes DM servers 105 and 140, a user equipment (UE) 115, and a network 110 to promote connection therebetween. The communications between the DM servers 105 and 140, the network 110 and the UE 115 may be via a wired or a wireless link or connection.

The DM servers 105 and 140 may be a system, subsystem or components of a network operator or service provider or other network component configured as DM server. The DM Servers 105 and 140 may forward a request, via the Network 110, to create, modify or delete a MO at the UE 115. The DM Servers 105 and 140 may also promote storing DM data related to the MOs on the UE 115. DM data may be stored in a DM tree 120 on the UE 115, on at least one of the DM Servers 105 and 140, or on both of the UE 115 and at least one of DM servers 105, 140.

The network 110 may use a Third Generation Partnership Project (3GPP) technology, an LTE technology, or some other technology. Internet protocols (IP) IPV4, IPV6, GPRS Tunneling Protocol (GTP), and/or other current or future protocols may be supported by these technologies. In addition, the network 110 may be serviced by any or a combination of Internet Protocol-based networks, packet-based networks, public-switched telecom networks, ad-hoc mesh-type networks and/or integrated services digital networks. The network 110 may be wired, wireless or both and may implement any know or after-developed network technology.

The UE 115 is operable for implementing aspects of the disclosure, but the disclosure should not be limited to these implementations. The UE 115 may take various forms including a mobile phone, a Smartphone, a wireless handset, a pager, a personal digital assistant (PDA), a portable computer, a tablet computer, or a laptop computer. Many suitable devices combine some or all of these functions. In some embodiments of the disclosure, the UE 115 is not a general purpose computing device like a portable, laptop or tablet computer, but rather is a special-purpose communications device such as a mobile phone, wireless handset, pager, or PDA. In another embodiment, the UE 115 may be a portable, laptop or other computing device.

A UE 115 may be pre-configured with a set of MOs, for example, from the manufacturer of the UE 115. The UE 115 may also include a DM client. The DM server 105 or 140 (or both) may issue a command to the DM client via the network 110. The command may be to create, modify or delete an MO on the UE 115. The DM client executes the change to the DM tree 120 and writes a record of the change to the change log 130.

For various reasons, other servers, such as a second DM server 140, may need to update the DM tree 120 of the UE 115. For example, a first DM server 105 may handle a first type of service and a second DM server 140 may handle a second type of service. Also, two DM servers may provide the same service, for example, to allow for data traffic balancing during peak data traffic periods. The second DM server 140 may require synchronization of the status of the DM tree 120 on the UE 115. The second DM server may send a status request via the network 110 to the UE 115. The DM client on the UE 115 may receive the request and retrieve the change log 130. The DM client may send the change log 130 or a portion of the change log 130 to the second DM server 140. The second DM server 140 may synchronize the DM tree status stored on the second DM server 140 with the change log 120 or partial change log received from the DM client.

In another embodiment, change entries (e.g., a subset of entries or each entry) in the change log 120 may be assigned a unique identifier to, for example, aid in synchronization. In one instance, the unique identifier may be related to when a change was made. For example, the unique identifier may be a time and/or date stamp or the like. In another instance, the unique identifier may be one or more alphanumeric characters that are sequentially incremented in nature, such as a one-up integer. For example, a first change may be assigned a unique identifier of 150. Each subsequent change may be assigned the next sequential integer. For example, the second change may be assigned unique identifier 151, and the third change may be assigned unique identifier 152 and so on. In this case, the DM server may transmit a status inquiry for changes based upon the unique identifier of the change. In response to the request from the DM server, the DM client may provide only the requested entries from the change log, thereby saving transmission resources. The DM server may also submit an inquiry related to the status of a specific change based upon the unique identifier. The DM server may also make a status inquiry for a range of unique identifiers.

Figure 2:
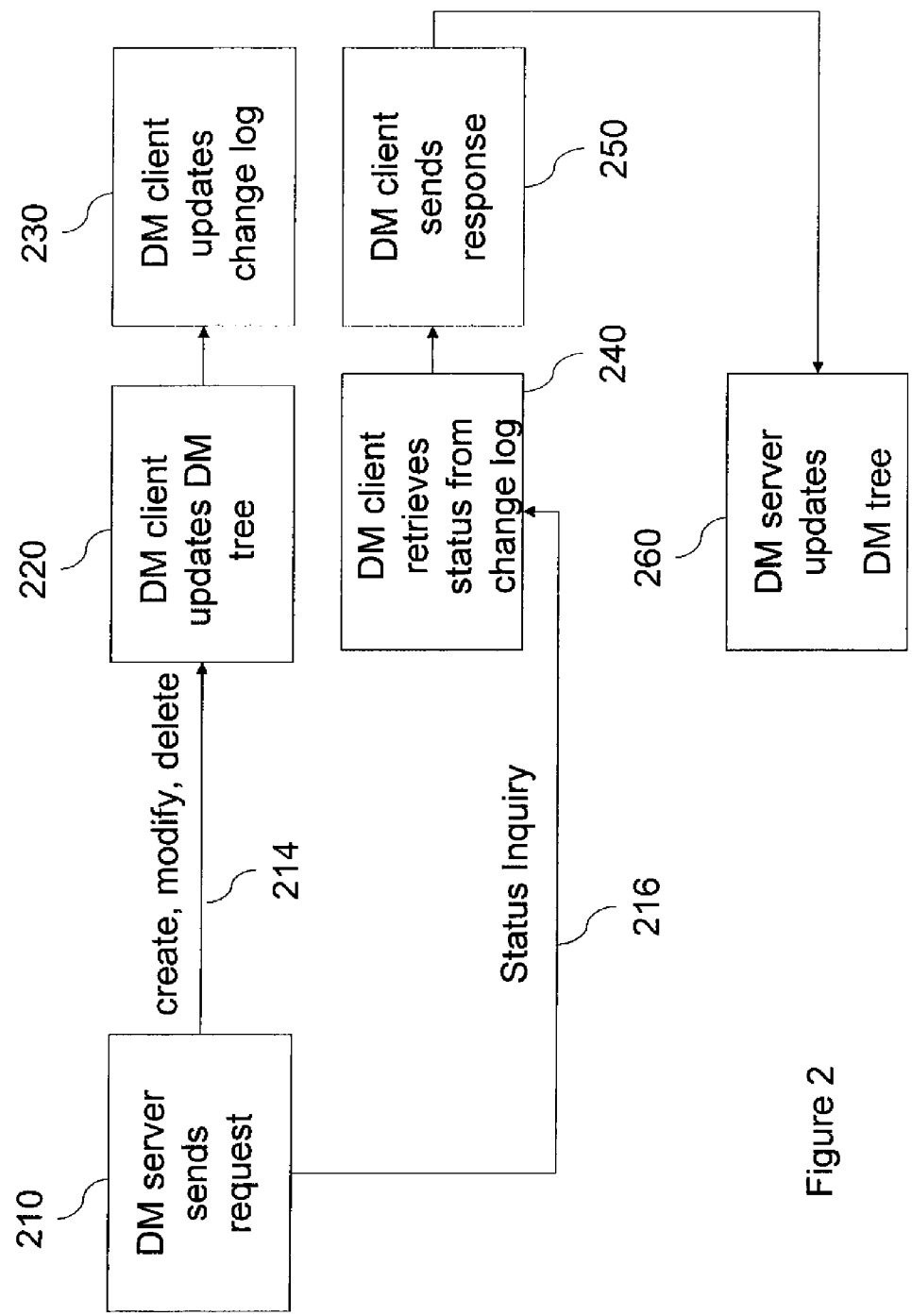
FIG. 2 illustrates a block diagram of an example method for tracking changes to a DM tree according to an embodiment of the present disclosure.

FIG. 2 illustrates a block diagram of a method for tracking device management data changes. In this embodiment, each MO is assigned a Uniform Resource Indicator (URI). The DM server sends a request to a DM client at block 210. If the request type is create, modify or delete, then the process continues via line 214. The DM client applies the change requested by the DM server to the DM tree on the UE at block 220. After applying the change, the DM client adds an entry to the change log noting the change at block 230. An example of the change log entry in this case may be:

<delta> <MO URI> <request type> <\delta>

In another case, if multiple modifications are performed by the DM client to the DM tree for the same MO, the DM client may apply logic to create an entry to the change log that represents the current state of the DM tree. For example if the same MO entry were modified several times on the DM tree, the DM client may create an entry to the change log that captures only the current state of the MO. An example of the change log entry in this case may be:

<delta> <MO URI> <modified> <current value> <\delta>

In another case, if multiple create and delete commands are performed by the DM client to the DM tree for the same MO, the DM client may apply logic to create an entry to the change log that represents the current state of the DM tree. In this case it may not be known whether the value of the MO was modified and whether it even existed in the DM tree prior to the start of the create and delete commands. If the MO still exists, an example of the change log entry in this case may be:

<delta> <MO URI> <add> <current value> <\delta>

If the MO no longer exists, an example of the change log entry in this case may be:

<delta> <MO URI> <delete> <\delta>

In another case, the DM server sends a request to a DM client at block 210. If, the request type is a status inquiry the process continues at line 216. The DM client retrieves the requested status from the change log at block 240. After retrieving the change log, the DM client sends a response to the DM server with the requested status at block 250. The DM server may then update the DM tree stored on the DM server with the received status at block 260. Additionally, the DM server may store a copy of the change log locally on the DM server. If the MO already exists in the DM tree stored on the DM server, the value of the status is written to the DM tree stored on the DM server. If the MO has been deleted by the DM client, the DM server deletes the entry from the DM tree stored on the DM server. If the MO has been created by the DM client, the DM server adds the MO to the DM tree stored on the DM server. The DM tree status may be transmitted by the DM client to other DM servers, or the DM server may transmit the DM tree status to other DM servers.

In another case, the DM server may collect entries from the change log on the UE and store them. The DM server may also store a copy of the original UE DM tree. If the DM tree is lost from the UE, the DM server may use the combination of the original UE DM tree and the entries from the change log to restore the UE DM tree. The stored entries from the change log may also be used to restore a UE to a previous configuration by rolling back the changes stored in the change log. Rolling back the DM tree on the UE may also be accomplished by storing reverse change log entries. For example, if a delete command is executed by the DM client, a corresponding reverse change log entry would be stored. In this example the reverse change log entry corresponding to the delete command would be an add command. If the UE needed to roll back to a previous version, the entries in the reverse change log would be applied to the DM tree. Applying the reverse change log entries would return the UE DM tree to a previous state.

Figure 3:
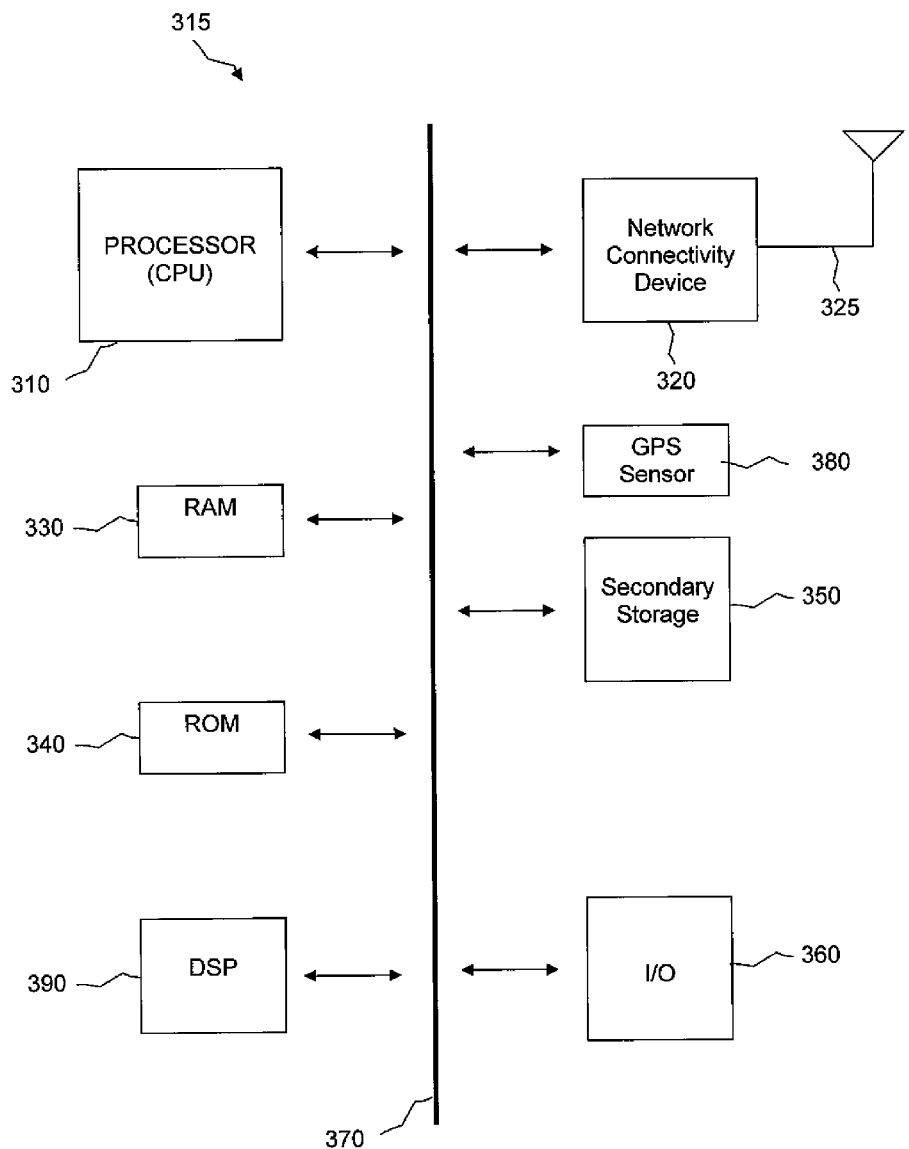
FIG. 3 is a diagram illustrating another example system suitable for implementing an embodiment of the present disclosure.

FIG. 3 is a diagram illustrating an example of another example system 315 that includes a processor 310 suitable for implementing one or more embodiments disclosed herein. In addition to the processor 310 (which may be referred to as a central processor unit or CPU), the system 315 might include network connectivity devices 320, random access memory (RAM) 330, read only memory (ROM) 340, secondary storage 350, Global Positioning Satellite (GPS) sensor 380, and input/output (I/O) devices 360. These components might communicate with one another via a bus 370. In some cases, some of these components may not be present or may be combined in various combinations with one another or with other components not shown. These components might be located in a single physical entity or in more than one physical entity. Any actions described herein as being taken by the processor 310 might be taken by the processor 310 alone or by the processor 310 in conjunction with one or more components shown or not shown in the drawing, such as a digital signal processor (DSP) 390. Although the DSP 390 is shown as a separate component, the DSP 390 might be incorporated into the processor 310.

The processor 310 executes instructions, codes, computer programs, or scripts that it might access from the network connectivity devices 320, RAM 330, ROM 340, or secondary storage 350 (which might include various disk-based systems such as hard disk, floppy disk, or optical disk). While only one CPU 310 is shown, multiple processors may be present. Thus, while instructions may be discussed as being executed by a processor, the instructions may be executed simultaneously, serially, or otherwise by one or multiple processors. The processor 310 may be implemented as one or more CPU chips.

The network connectivity devices 320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 320 may enable the processor 310 to communicate with the Internet or one or more telecommunications networks or other networks from which the processor 310 might receive information or to which the processor 310 might output information. The network connectivity devices 320 might also include one or more transceiver components 325 capable of transmitting and/or receiving data wirelessly.

The RAM 330 might be used to store volatile data and perhaps to store instructions that are executed by the processor 310. The ROM 340 is a non-volatile memory device that typically has a smaller memory capacity than the memory capacity of the secondary storage 350. ROM 340 might be used to store instructions and perhaps data that are read during execution of the instructions. Access to both RAM 330 and ROM 340 is typically faster than to secondary storage 350. The secondary storage 350 is typically comprised of one or more disk drives or tape drives and might be used for non-volatile storage of data or as an over-flow data storage device if RAM 330 is not large enough to hold all working data. Secondary storage 350 may be used to store programs that are loaded into RAM 330 when such programs are selected for execution.

The I/O devices 360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 325 might be considered to be a component of the I/O devices 360 instead of or in addition to being a component of the network connectivity devices 320.

The GPS sensor 380 decodes global positioning system signals, thereby enabling the system 315 to determine its location. The system 315 may also determine its location using the transceiver 325. Location may be determined using Enhanced Observed Time Difference (EOTD), a position-location method wherein the UE triangulates its position using signals received by the transceiver 325. Other common methods of triangulation include Uplink Time Difference of Arrival (U-TDOA), Angle of Arrival (AOA), Location Pattern Matching (LPM) and Advanced Forward Link Trilateration (AFLT).

In an embodiment, a user equipment is provided, comprising a processor such that responsive to modification of device management (DM) data that is stored in an Open Mobile Alliance (OMA) compliant DM tree of Managed Objects (MO), the processor is configured to store information relating to the modification of the DM data.

In another embodiment, a network component is provided, comprising a processor such that responsive to modification of device management (DM) data that is stored in an Open Mobile Alliance (OMA) compliant DM tree of Managed Objects (MO), the processor is configured to store information relating to the modification of the DM data.

In another embodiment, a method for tracking device management data changes is provided, comprising storing information related to modification of device management (DM) data, wherein the DM data is an Open Mobile Alliance (OMA) compliant DM tree of Managed Objects (MO).

In another embodiment, a user equipment is provided, comprising a processor configured to receive a change record and use the change record to update a device management (DM) tree on the user equipment (UE), the DM tree on the UE is comprised of Open Mobile Alliance (OMA) compliant Managed Objects (MO).

In another embodiment, a network component is provided, comprising a processor configured to receive a change record and use the change record to update a device management (DM) tree on the network component, the DM tree on the network component comprised of Open Mobile Alliance (OMA) compliant Managed Objects (MO).

In another embodiment, a method for synchronizing a data management tree is provided, comprising receiving a change record and using the change record to update a device management (DM) tree on a first device, the DM tree on the first device comprised of Open Mobile Alliance (OMA) compliant Managed Objects (MO).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
    receiving a communication at a Device Management (DM) client on a user equipment (UE), the communication being from a DM server and commanding a change to a DM tree on the UE;
    modifying the DM tree based on the communication;
    creating a delta record that indicates the change made to the DM tree; and
    sending the delta record to the DM server.

2. The method of claim 1 further comprising, storing the delta record in the UE.

3. The method of claim 1 wherein creating comprises associating an identifier with the delta record, the identifier being at least one of a sequence number and a timestamp.

4. The method of claim 1 further comprising, receiving from the DM server a request regarding a status of the DM tree, and wherein the sending is performed in response to the request.

5. The method of claim 1 wherein the change comprises one of: adding a Management Object (MO) to the DM tree; deleting a MO from the DM tree; and updating a value of a MO of the DM tree.

6. The method of claim 1 wherein the DM client, DM server and DM tree are compliant with an Open Mobile Alliance (OMA) DM specification.

7. A user equipment comprising:
    a network interface configured to receive a communication from a Device Management (DM) server, the communication commanding a change to a DM tree on the user equipment; and
    a processor configured to execute a DM client, the DM client being operable to: modify the DM tree based on the communication; and create a delta record that indicates the change made to the DM tree,
    wherein the processor is in communication with the network interface for sending the delta record to the DM server.

8. The user equipment of claim 7 wherein the DM client is further operable for storing the delta record in the user equipment.

9. The user equipment of claim 7 wherein the DM client associates an identifier with the delta record, the identifier being at least one of a sequence number and a timestamp.

10. The user equipment of claim 7 wherein the network interface is further configured to receive from the DM server a request regarding a status of the DM tree, and wherein the network interface is further configured to send the delta record in response to the request.

11. The user equipment of claim 7 wherein the change comprises one of: adding a Management Object (MO) to the DM tree; deleting a MO from the DM tree; and updating a value of a MO of the DM tree.

12. The user equipment of claim 7 wherein the DM client, DM server and DM tree are compliant with an Open Mobile Alliance (OMA) DM specification.

13. A method comprising:
    generating, at a Device Management (DM) server, a communication commanding a change to a DM tree on a user equipment (UE);
    sending the communication to a DM client which manages the DM tree on the UE; and
    receiving from the DM client a delta record that indicates the change made to the DM tree.

14. The method of claim 13 wherein the delta record includes an identifier, the identifier being usable by the DM server for retrieval of the delta record.

15. The method of claim 14 wherein the identifier comprises at least one of a sequence number and a timestamp.

16. The method of claim 13 further comprising sending a request to the DM client to retrieve a status of the DM tree, wherein the receiving occurs based on the request.

17. The method of claim 13 further comprising updating a second DM tree according to the delta record.

18. The method of claim 13 wherein the change comprises one of: adding a Management Object (MO) to the DM tree; deleting a MO from the DM tree; and updating a value of a MO of the DM tree.

19. The method of claim 13 wherein the DM client, DM server and DM tree are compliant with an Open Mobile Alliance (OMA) DM specification.

20. A network component comprising:
a processor configured to execute a Device Management (DM) server, the DM server being operable for commanding a change to a DM tree on a user equipment (UE); and
a network interface in communication with the processor, the network interface being configured to: send a communication to a DM client on the UE, the communication commanding the change to a DM tree on the UE; and receive from the DM client a delta record that indicates the change made to the DM tree.

21. The network component of claim 20 wherein the delta record includes an identifier, the identifier being usable by the DM server for retrieval of the delta record.

22. The network component of claim 21 wherein the identifier comprises at least one of a sequence number and a timestamp.

23. The network component of claim 20 wherein the network interface is further configured to send a request to the DM client to retrieve a status of the DM tree, wherein the network interface receives the delta record in response to the request.

24. The network component of claim 20 wherein the DM server is further configured to update a second DM tree according to the delta record.

25. The network component of claim 20 wherein the change comprises one of: adding a Management Object (MO) to the DM tree; deleting a MO from the DM tree; and updating a value of a MO of the DM tree.

26. The network component of claim 20 wherein the DM client, DM server and DM tree are compliant with an Open Mobile Alliance (OMA) DM specification.

27. A tangible computer readable medium storing instructions thereon which when executed by a user equipment (UE), cause the UE to perform the operations of:
receiving a communication at a Device Management (DM) client on the UE, the communication being from a DM server and commanding a change to a DM tree on the UE;
modifying the DM tree based on the communication;
creating a delta record that indicates the change made to the DM tree; and
sending the delta record to the DM server.

28. A tangible computer readable medium storing instructions thereon which when executed by a network component, cause the network component to perform the operations of:
generating, at a Device Management (DM) server, a communication commanding a change to a DM tree on a user equipment (UE);
sending the communication to a DM client which manages the DM tree on the UE; and
receiving from the DM client a delta record that indicates the change made to the DM tree.

* * * * *